United States Patent [19]
Curtis et al.

[11] Patent Number: 5,808,998
[45] Date of Patent: Sep. 15, 1998

[54] BIT ERROR RATE REDUCTION BY REDUCING THE RUN LENGTH OF SAME-STATE PIXELS IN A HALOGRAPHIC PROCESS

[75] Inventors: Kevin Curtis, Summit; Clifford Eric Martin, Martinsville; Thomas J. Richardson, South Orange; Michael C. Tackitt, Califon; Peter M. Winkler, Madison, all of N.J.

[73] Assignee: Lucent Technologies Inc, Murray Hill, N.J.

[21] Appl. No.: 579,497

[22] Filed: Dec. 27, 1995

[51] Int. Cl.$^6$ .............................. G11B 7/00; G03B 1/26
[52] U.S. Cl. ......................... 369/103; 369/124; 359/22
[58] Field of Search ................... 369/103, 107, 369/112, 124; 359/3, 32, 29, 21, 10, 22, 296

[56] References Cited

U.S. PATENT DOCUMENTS

| | | | |
|---|---|---|---|
| 3,689,899 | 9/1972 | Franaszek | 340/172.5 |
| 4,566,031 | 1/1986 | Kirk | 359/296 |
| 5,285,308 | 2/1994 | Jenkins et al. | 359/260 |
| 5,339,305 | 8/1994 | Curtis et al. | 369/103 |
| 5,450,218 | 9/1995 | Heanue et al. | 369/103 |
| 5,511,058 | 4/1996 | Visel et al. | 369/103 |
| 5,703,705 | 12/1997 | Curtis et al. | 369/103 |

OTHER PUBLICATIONS

*Scientific American,* Nov. 1995, p. 70.
1995 OSA Conf. on Optical Computing, *OSA Technical Digest Series,* vol. 10, pp. 219–221.

Hornbeck, L.J., "Deformable–Mirror Spatial Light Modulators", *Proc. SPIE, Spatial Light Modulators and Applications III,* vol. 1150, pp. 1–17, Aug. 1989.

Alan Marchant, *Optical Recording: A Technical Overview,* Addison–Wesley, chap. 9 (1990).

W. Press, et al., *Numerical Recipes in C: The Art of Scientific Computing,* Cambridge University Press, chap. 7, pp. 204–237 (1988).

D.Tang, et al., "Block Codes for a Class of Constrained Noiseless Channels", *Info. and Control,* vol. 17, pp. 436–461 (1970).

P.H. Siegel, et al., "Modulation and Coding for Information Storage", *IEEE Communication Magazine,* vol. 29, No. 12, pp. 68–86 (1991).

T.M. Cover, et al., *Elements of Information Theory,* pp. 319–326, John Wiley and Sons, 1991.

A.R. Calderbank, et al., "Binary Convolutional Codes with Application to Magnetic Recording", *IEEE Trans. on Info. Theory,* vol. IT–32, No. 6, pp. 797–815 (1986).

F.J. MacWilliams, et al., "The Theory of Error–Correcting Codes", North–Holland Pub. Co., Amsterdam, pp. 567–595 (1977).

*Primary Examiner*—Tod R. Swann
*Assistant Examiner*—Kim-Kwok Chu
*Attorney, Agent, or Firm*—George S. Indig

[57] ABSTRACT

Bit error rate of an output data stream, reconstructed from a holographic recording, is reduced by reducing the length of same-state pixels on the spatial light modulator.

22 Claims, 1 Drawing Sheet

BIT ERROR RATE REDUCTION BY REDUCING THE RUN LENGTH OF SAME-STATE PIXELS IN A HALOGRAPHIC PROCESS

TECHNICAL FIELD

Holography

DESCRIPTION OF RELATED ART

*Scientific American*, Nov. 1995, at p. 70, discusses holography and its promise for information storage. The article first reviews the importance of optical storage, stressing the role of the compact disc in video and in computing—the present storage capability of the CD-ROM is 640 Mbytes, and it is expected to increase by an order of magnitude on the basis of work in progress. The article then discusses the orders-of-magnitude further improvement offered by holographic recording.

Highest densities require multiplexing. Multiplexing may depend: on angle of incidence of the reference beam on the recording medium; on wavelength; on phase. All have been proposed for recording successive holographic "pages" in a specified region of recording medium.

An article in 1995 *OSA Conf. on Optical Computing, OSA Technical Digest Series*, vol. 10, pp. 219–221, describes a variant. That process, "shift holography" depends on partially overlapping holograms produced by shifting the recording medium relative to the signal and reference beams between exposures/pages. Postulated densities are ~100 bits/$\mu m^2$ using 8 mm thick crystals of iron-doped $LiNbO_3$. Truly a volume holographic technique, recording density is significantly less for thin media.

A method described in co-pending U.S. patent application Ser. No. 08/435,705, filed May 5, 1995, now U.S. Pat. No. 5,719,691 issued on Feb. 17, 1998, hereby incorporated by reference, permits use of thin recording media-thicknesses typically 1 mm and less—while retaining storage densities of shift holography. That method, "Phase Correlation Multiplex Holography" (PCMH), substitutes phase correlation for Bragg angle as the means for differentiating successive partial overlapping holograms. Illustrative, a binary random phase mask of 1 $\mu m$ pixel pitch is spatially filtered and then shifted with the recording medium, relative to the beams so that each hologram "sees" a different phase and intensity pattern for successive pages. Densities of hundreds of bits/$\mu m^2$ for shift distances of a few $\mu m$ have been attained.

Holographic multiplexing systems typically depend on data introduction by means of a spatial light modulator (SLM). Serving to avoid delay time needed for changing fixed transparencies, the SLM is an electronically-addressable pixel array in which pixel state is dictated by locally-altering transmission or reflectivity. The pixel-represented information is then imposed on an incident light beam which, as modulated, becomes the signal beam. Interference between this signal beam and the reference beam within the recording medium produces a hologram. SLMs may operate by various principles: e.g. by altering refractive index to change phase (to result in selective destructive interference); by use of a liquid crystal array in conjunction with a polarizer (in transmissive or reflective mode); by changing reflectance with a deformable mirror array. See, Hornbeck, L. J., "Deformable-Mirror Spatial Light Modulators", *Proc. of SPIE*, Spatial Light Modulators and Applications III, vol. 1150, pp. 1–17, August 1989.

It is expected that PCMH, will speed the transition from $LiNbO_3$ to thin film polymeric recording media. Photo-induced refraction in such film media is due to simple photo-induced polymerization which is easily tailored to meet requirements. Polymers are less costly and do not share $LiNbO_3$ disadvantages: need for post-fixing, low sensitivity, and danger of optical damage during readout.

Limitations on density due to signal-to-noise ratio (SNR), related e.g., to material characteristics and their relationship to page density, are believed well understood. SLM/detector defects introduced either in manufacture or in operation are generally analogous to those in other technologies using arrays. U.S. application Ser. No. 08/579,525 filed Dec. 27, 1995 claims a remedy suitable for improving error tolerance in PCMH and other contemplated holographic storage/retrieval procedures. That remedy disperses bits in partitioned groups in order to statistically reduce the likelihood of related bits being corrupted by a single point defect. Error correction coding (ECC) continues to be useful in order to achieve adequate freedom from error. It is confidently expected that anticipated recording densities of ~200 bits/$\mu m^2$ will be closely approached.

Terminology

Bit—Element in a one-dimensional information stream. Bits exist in either of the two digital states—"1's" and "0's". The term is applied to either digital state. The designations are not intended to signify which of the states is of higher energy. Particularly relevant bit streams are those constituting "input data" (prior to an SLM) and "output data" (as produced by detector electronics).

Pixel—Information-bearing element in a two-dimensional array representative of bit population. Where representative of a single bit or where multiple pixels constitute a single bit, the pixel, like the bit, may be in either of two states—"on" or "off". Where representative of two or more bits, the pixel may be in an intermediate (gray) state. If not otherwise indicated, the term is generic to pixels in any permitted state.

Input Data—One-dimension al bit stream, subsequently processed to yield pixels, together constituting "arrayed data".

Arrayed Data—Processed input data, converted to two-dimensional form, suitable for use in the two-dimensional array adapted for modulating incident light and for producing the signal beam. It may be further processed by the SLM drive electronics to place it in proper form for display, e.g. by D to A conversion as required for gray-scale pixels.

SLM—Spatial light modulator—constituted of a pixel array which, as modulated by information in the input data, displays "arrayed data".

Pseudo-Random Bit Stream—Consistent with general usage this is a stream which may be regarded as truly random under conditions of use. Its "period" (the distance required for its pattern to repeat), is longer than the distance over which it s behavior is "random". In the multiplexing art of the invention, one conservative practice is generation of a stream of a period equal to a complete holographic page. In terms of the invention, the period is of sufficient length that, after arraying, same-state pixels occur at a frequency approaching that of an array chosen uniformly at random.

BER—Bit error rate or the number of erroneous bits expressed as a fraction of the total number of bits.

Raw BER—This is the BER without benefit of error correction coding, (ECC), i.e., BER as measured without ECC decoding. (The term applies whether or not there has been ECC encoding and whether or not there has been scrambling compression, or other encoding/decoding.)

Net BER—BER after ECC decoding.

SUMMARY OF THE INVENTION

A method for data presentation in holography increases useful storage density. The method is applicable to generation of single holograms but is of particular value in multiplexing. Its impact is significant when used with polarization rotating or reflectance-varying SLMs. In general terms, the method processes input signal data so as to reduce bit error rate.

The inventive observation is based on experiment. With no known parallel—without analogy in other forms of recording—it is found that contiguous same-state pixels whatever their origin—whether made up of bits from a common codeword or not—in-line or in two-dimensional groups increase error rate and reduce SNR, so that expected recording densities are effectively precluded.

Error rate is reduced by processing the input data stream to reduce clumping. In one approach, the information-bearing bit stream is combined with a pseudo-random bit stream which reduces the probability of contiguous same-state pixels. A second approach, "pixel run-length limiting", deterministically prohibits contiguity beyond some permitted limit. Both approaches consider in-line as well as two-dimensional pixel clumps.

The invention increases storage density under all conditions—with comparison as between use and omission of the inventive process. The improvement is realized regardless of presence/absence or level of ECC or any other processing upon introduction of the inventive process. The invention may be utilized in order to increase storage density or alternatively to reduce the degree of error correction required by ECC or other processing for a prescribed (unchanged) density.

DETAILED DESCRIPTION

General

Figure 1:
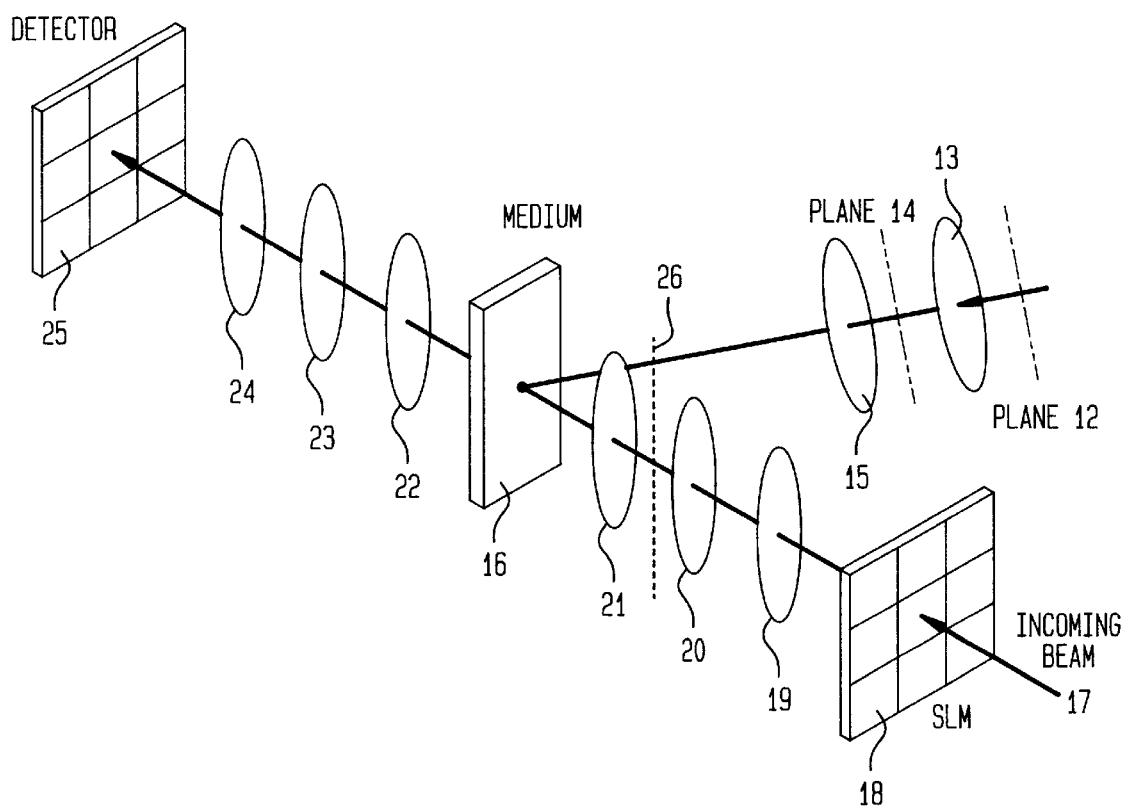
FIG. 1 is a copy of FIG. 1 of co-pending U.S. application Ser. No. 08/435,705, schematically depicting apparatus and processing useful in the PCMH of that application. Discussion of a more general class of multiplex holography suitable for practice of the present invention is based on this figure.

The invention is described in terms of storage density. It has been stated that its impact is attainment of expected densities of tens or a hundred or more bits/$\mu m^2$—an objective found to be hindered by clumping of same-state pixels. The solution applied—that of encoding the input data stream to lessen clumping of same-state pixels in order to reduce bit error rate (BER)—may serve diverse objectives. In accordance with the invention, its serves for attainment of storage density values above the 1–10 bit/$\mu m^2$ level associated with CD-ROMs. It is contemplated that the inventive processing will be combined with usual ECC at tolerable overhead cost preferably within the range of 20–30% or lower. In more general terms, the inventive result may serve to reduce ECC overhead or to reduce net BER.

Bit error rate is found to increase with the number of contiguous same-state pixels on the SLM. The effect is observed for contiguous 0's or 1's, or for pixels at the same gray scale, and obtains for contiguous pixels in rows, columns, or in two-dimensional clumps. The effect is aggravated for multiplexed holograms. Due to generation of noise from other sources during multiplexing, the effect becomes more critical.

The advance lies primarily in recognition of the effect. Illustrative remedies are well understood, and derive from procedures which have been considered in general treatises or which have been applied for other purpose. All depend on the relationship of bits in an incoming one-dimensional bit stream to pixels in a two-dimensional array.

Aside from overhead consideration, a preferred embodiment of the invention is deterministic. "Run-length limiting" has been used for tracking the recording path on a CD-ROM. As used for that purpose, it assures sufficient distribution of transition-state bits for reliable tracking and timing. It is here used for limiting the number of permitted contiguous same-state pixels. Suitable algorithms are known. See, for example, *Optical Recording: A Technical Overview*, by Alan B. Marchant, Addison-Wesley, chap. 9 (1990).

Statistical remedies have less overhead (need not introduce additional bits), and may be sufficient. Another preferred embodiment combines the information-bearing bit stream with a "reference" pseudo-random bit stream (of repetition rate corresponding with tolerable error rate). Combination, e.g. by addition modulo 2, produces an encoded information stream of the same characteristics as the reference. Algorithms for deriving reference streams and for their use in encoding (e.g. for exclusive "or" combination) are well known. See, *Numerical Recipes in C: The Art of Scientific Computing*, by W. Press, et al., Cambridge University Press, chap. 7, pp. 204–237 (1988).

All remedies have the effect of reducing the number of contiguous same-state pixels on the SLM. Remedies are, for the most part, sufficiently understood so that recognition of the problem, together with the desired reduction (in "pixel run-length"), is sufficient information for the artisan to specify an appropriate remedy. Significant error-rate improvement has resulted from encoding of an input datastream which, before encoding has contiguous groupings with average as few as 10 same-state pixels. On the other hand, limiting run-lengths to 5 appears to minimize the number of errors.

The examples are representative of experimental data which was conducted before any ECC decoding. Raw BER values in the $10^{-2}$–$10^{-5}$ range are amenable to ECC for upgrading to $10^{-12}$–$10^{-17}$ level (with ECC overhead at 20 %–30%). Reed-Solomon code practice, is illustrative of ECC practice which introduces parity bits (which, together with information-bearing bits, constitute "codewords"). With application of the invention-dictated encoding programs, error rates have shown improvement of at least a factor of 2 on either basis under experimental conditions.

The invention has been described as entailing either run-length (pixel) limiting or combination with a pseudo-random reference bit stream. While these methods are preferred in that either uniformly improves BER generally without regard to data format, the inventive teaching suggests alternative procedures which may be generally less effective, but which may be usable particularly with specified format. Alternative procedures, their limitations and areas of use are described:

a) Run-length (bit) limiting as applied to the input one-dimensional bit stream statistically reduces pixel run-length. See, D. Tang and L. Bah, "Block Codes for a Class of Constrained Noiseless Channels", *Info. and Control*, vol. 17, pp. 436–461 (1970) and U.S. Pat. No. 3,689,899, issued Sep. 5, 1972. Like pixel run-length limiting, this process is applicable to most generally encountered data formats. Bit run-length limiting is somewhat less effective in that it does not provide for the 2-dimensional nature of the arrayed data (required for practice of the invention).

b) Forms of bit scrambling are of limited effectiveness. Expedient forms do not approach the random state attained by combination with a pseudo-random bit stream. See, P. H. Siegel and J. K. Wolf, "Modulation and Coding for Information Storage", *IEEE Communication Magazine*, vol. 29, no. 12, pp. 68–86 (December 1991).

c) Data compression, common for better utilizing storage or transmission capacity, like scrambling, tends to randomize data and thereby to limit same-state run-lengths. See, T. M. Cover and J. A. Thomas, *Elements of Information Theory*, pp. 319–326, John Wiley and Sons, 1991. The effect of compression is to reduce the number of bits per unit of information. A consequence—that of reducing the number of errors—is likely to predominate over a second consequence—that of increasing susceptibility of (remaining) bits to error.

d) Differential encoding, similar to a practice in optical and magnetic disk tracking also reduces run-length of same-state bits. See, A. R. Calderbank, et al., "Binary Convolutional Codes with Application to Magnetic Recording", *IEEE Trans. on Info. Theory*, vol. IT-32, no. 6, pp. 797–815 (1986).

e) Generally, BER values are optimized by proper selection of ECC. In appreciation of the objective, coding may be chosen so as to consist of codewords avoiding runs of like bits, e.g. by using a co-set of a linear code or by eliminating all-zero codewords. See, A. R. Calderbank, et al. cited in paragraph "e" above. Similarly, codewords may be interleaved.

f) Multiple levels of ECC, a practice for further reducing BER, further reduces pixel run-length in combination with either of the two fundamental embodiments—with either run-length pixel limiting or combination with a random bit stream. For this practice, as well as a general survey of ECC, see F. J. MacWilliams, et al., "The Theory of Error-Correcting Codes", North-Holland Pub. Co., Amsterdam, pp. 567–595 (1977).

The System

FIG. 1 shows incoming beam 11 which will serve as a reference beam. Considering the system for PCMH (co-pending U.S. patent application Ser. No. 08/435,705), the incoming beam is converted into a phase beam by a phase mask located on plane 12. It next passes through lens 13; is spatially filtered by a filter on plane 14; passes through lens 15 and strikes recording medium 16. With lenses 13 and 15 in 4F configuration, the mask is imaged on medium 16. Spatial filtering is effectively carried out on a Fourier plane 14 (with plane 14 on the Fourier plane for the lens pair). Magnification of the mask image is determined by the focal lengths of the lenses. One set of experiments in this co-pending application used a random binary phase mask constituted of a 1024×1024 array of 20 $\mu$m pitch pixels. In this illustration, half of the randomly located pixels impose a phase-shift of 180° so that the average phase across the beam front is zero.

A second incoming beam 17 is modulated by spatial light modulator (SLM) 18. The resulting signal beam is routed through lenses 19, 20, and 21. Corresponding lenses 22, 23, and 24 are used in readout. With both sets of lenses in 4F configuration, a Fourier transform is recorded in medium 16, and an image is reconstructed on detector 25. (4F configuration requires focal distance spacings so that, e.g. SLM-to-lens spacing is equal to the focal distance of lens 19, lens 24-to-detector spacing is equal to the focal distance of lens 24, and lens-to-lens spacings are the sums of the focal distances of the lenses in the pair). Omitting a single lens in lens set 19, 20, 21 replaces the transform with the image at the medium—omitting a lens in set 22, 23, 24 again results in image reconstruction at the detector.

The specifics of the arrangements of FIG. 1 are illustrative. By omitting the phase mask, lens 13, and the spatial filter at plane 14, and by defocusing the reference beam to obtain sufficient overlap with the signal beam, the system is suitable for "shift holography". The figure is intended to represent other forms of multiplex holography, in which successive pages are completely superimposed in the same region of the medium, as well as single-page holography (without multiplexing).

Variants include lens arrangements for recording or detecting a Fourier transform or an image of the signal with enlargement or reduction, and for additional spatial filtering for improved SNR. Individual plane waves, multiple plane waves, and spherical beams have been used as reference beams in more traditional holography and can be used here as well. The precise position of the phase mask in PCMH, is not critical, but, together with other elements in the reference path, must be in the same position for recording and readout. A phase mask in contact with SLM 18 or at image plane 26 assures uniform brightness of the signal beam for optimal recording. The signal beam may be filtered to eliminate noise or higher-order diffraction modes. 4F spacing may be replaced by other lens arrangements either for imaging or for Fourier transform.

Data Presentation

Figure 2:
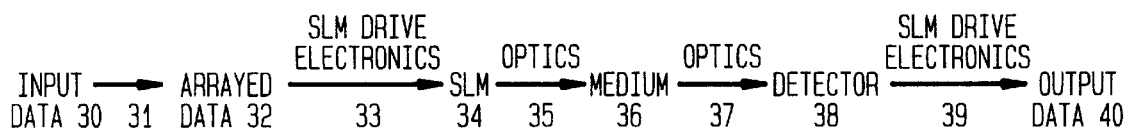
FIG. 2 is a generalized flow chart for holographic recording and reconstruction.

The inventive teaching and examples are discussed in conjunction with the FIG. 2 flow chart. The first entry on the chart, input data 30, is a one-dimensional bit stream. It is encoded by ECC and possibly by other means, is rearranged, and modified in accordance with the invention at 31 to form arrayed data 32, which is then converted to a suitable form by the SLM drive electronics at 33 (e.g., where there is provision for gray-scale pixels, by D to A conversion), and is introduced to SLM 34. The incident beam is modulated by the arrayed data on the SLM to form a signal beam, and after routing by optics 35, is combined with a reference beam, not shown, so as to yield a hologram in medium 36. During read-out, a read-out beam, not shown, is modulated by the recorded hologram in medium 36; and is passed through optics 37 to produce an image on detector 38. The imaged signal is then converted into digital output data stream 40 by detector electronics 39, thereby replicating input stream 30. (The flow chart does not show ECC nor other process steps conventional in prior art holography.)

In experiments, the incoming bit stream 30 was made up of 8 bit codewords containing 3 ECC bits together with one error detecting bit. See, *The Theory of Error-Correcting Codes*, cited above. In arraying, the one-dimensional stream was transformed into a matrix, with one codeword bit per line and with 608×448 pixels per page. Each bit was, differential encoded with two pixels. For example, a "1" bit was represented by an "on,off" pair of pixels, while a "0" but was represented by an "off,on" pair.

Decoding

It is appropriate to describe the invention in terms of the decoding procedures which operate to retrieve the original information, and which, in accordance with the advance, improve BER. In general terms, decoding consists simply of "undoing" encoding. Two fundamental types of encoding are discussed, and corresponding decoding procedures for the two may be described. Retrieval of information which has been encoded by combination with a random bit stream is decoded by combining with the identical reference bit stream. Data encoded by deterministic run-length limiting is decoded by use of a corresponding decoding algorithm which reverses the encoding process. Such a decoding algorithm can be identified by encoding a test stream, applying the algorithm in question to the encoded stream, and verifying that the output is identical to the original stream.

Alternative decoding procedures (for addressing either encoding by combination with a pseudo random bit stream or by deterministic run-length limiting) share a feature which is not characteristic of other decoding procedures. Other procedures (not depended on as sole procedures for addressing) increase the number of bits in the course of decoding. The first included inventive method, combination with a pseudo-random bit stream, does not change the number of bits in the course of decoding. Decoding for accommodating deterministic run-length limiting decreases the number of bits (by the same number increased by encoding).

The usual objective is retrieval of information in the form of a one-dimensional bit stream, and accordingly, the ultimate product is in that form. On occasion, the intended final format is 2-dimensional. Described procedures are effective in encoding/decoding for either purpose.

THE EXAMPLES

The experimental system used was of the form of flow chart 2 and consisted of a commercially-available twisted nematic liquid crystal spatial light modulator (34) with a 640×480 pixel array of 42 micron pitch pixels. Detector (38) was a CCD of 24 μm pixel pitch. The system provided for gray-scale pixels—the detector converts the incoming analog signal into digital information with 16 bits per pixel resolution. The input data bit stream (30) was produced from a video graphics array (VGA) computer card, and was passed through the system one page at a time.

Example 1

A file of 171,384 bytes (8 bits per byte) was presented to the system in the form of 23 sequentially introduced SLM pages. Five pages contained a significant number of same-state pixel runs containing 10 or more pixels. For the whole file, the average same-state pixel run-length was 38.8 pixels and the maximum was 38,418. The BER was $6.94 \times 10^{-3}$.

Example 2

The procedure of Example 1 was repeated, with a single change—the input data stream was combined by Exclusive OR-ing with a pseudo-random reference stream as the final procedure before arraying. Each four bytes of input data was combined with a new random number. Reference numbers were generated by means of the following algorithm.

Starting conditions for the first random number:
seed=99999, m1=32007770, m2=23727810,
For each successive random number:
m3=m1+m2+seed
If (m2<50000000), m3 =m3+1357
If (m3≧100000000, m3=m3−100000000
m1=m2
m2=seed
seed=m3
Pseudo-random number=m3

Pseudo-random generators and their application are discussed in *Numerical Recipes in C: The Art of Scientific Computing*, cited above. After processing, average run-length of same-state pixels was 2(as expected for a random stream of pixels.) The resulting BER was improved by a factor of 176 to approximately $3 \times 10^{-5}$.

An experiment using run length limiting was not conducted under the conditions of Example 1. To first approximation, results approximating those of Example 2 result by use of a program limiting run length to 5.

Inventive Scope

While applications for fields other than holography are not visualized, the manifestation addressed by the invention is characteristic of SLM behavior. Other processes operating on the basis of a one-dimensional input digital data stream may be modified by direct use of the described practices.

Summarily, while decreasing same-state pixel run-length is useful without regard to magnitude, useful BER reduction is reliably assured by changing run-length by at least 10%.

Co-filed U.S. application Ser. No. 08/579,524, hereby incorporated by reference, claims another procedure for decreasing net error rate. That procedure whereby, codewords are dispersed to lessen the number of bits from any single codeword on a specific row or column, makes error bits more amenable to correction by ECC and is independent of the procedure of this invention. Operation of the two procedures in tandem results in improvement which is substantially additive.

The invention claimed is:

1. Process comprising reconstruction of stored data constituted of symbols, the process including detection of the data in the form of a 2-dimensional pixel array, and decoding the pixel array the pixel array containing contiguous same-state pixels constituting "same-state pixel runs" of an average value of run-length,

CHARACTERIZED IN THAT decoding comprises a decoding procedure increasing average same-state pixel run-length by at least 10% and in that the decoding procedure does not increase the number of symbols.

2. Process of claim 1 in which the encoding procedure introduces additional symbols by at least 10% expressed as a fraction of the total number of symbols in the decoded pixel array.

3. Process of claim 1 in which the decoding procedure does not alter the number of symbols in the decoded pixel array.

4. Process of claim 1 whereby BER (bit error rate) is improved by a factor of at least two, improvement being independent of the effect of Error Correction Coding (ECC) and of any compression.

5. Process of claim 4 in which decoding includes ECC decoding and in which BER is $<10^{-0}$.

6. Process of claim 1 in which stored data is derived from arrayed data produced from input data by a procedure including the step of modulating light by means of a Spatial Light Modulator (SLM) display, the SLM being comprised of different-state pixels constituting an array, to produce a "signal beam" modulated by such pixels.

7. Process of claim 6 in which stored data is holographic and is contained within a storage medium.

8. Process of claim 7 in which stored data is stored by multiplex holography so that the storage medium contains a succession of holograms at least partially occupying the same volume of the medium.

9. Process of claim 8 in which holograms of the succession are incompletely superimposed so that they only partially occupy the same volume of the medium.

10. Process of claim 9 in which incompletely superimposed holograms are differentiated during reconstruction by Phase Correlation Multiplex Holography (PCMH).

11. Process of claim 1 in which detected data is in the form of a 2-dimensional array of pixel rows and columns, pixels comprising codewords constituted of codeword-common symbols and in that codewords of the detected data are 2-dimensionally dispersed so that at least some of the codeword-common symbols of a particular codeword occupy different rows or columns and in that decoding process comprises reassembly of dispersed symbols to form undispersed codewords.

12. Process comprising holographic storage to yield stored data amenable to holographic reconstruction, the process including the steps of introducing input data in the form of a one-dimensional bit stream, arraying and processing input data and displaying processed arrayed data on a spatial light modulator as an array of different-state pixels, illuminating the spatial light modulator in order to modulate illumination and produce a signal beam, and combining the signal beam with a reference beam within a holographic recording medium so as to produce a hologram in the medium CHARACTERIZED IN THAT
processing includes encoding so as to reduce average length of same-state pixel runs on the said processed array, in which reduction is independent of reduction caused by ECC (Error correction Coding) and of any signal compression.

13. Process of claim 12 in which processing includes encoding by combination of input data with a pseudo-random bit stream.

14. Process of claim 12 in which processing includes deterministically limiting average run-length of same-state pixel runs.

15. Process of claim 12 in which stored data is holographic and is contained within a storage medium.

16. Process of claim 15 in which stored data is stored by multiplex holography so that the storage medium contains a succession of holograms at least partially occupying the same volume of the medium.

17. Process of claim 16 in which holograms of the succession are incompletely superimposed so that they only partially occupy the same volume of the medium.

18. Process of claim 17 in which incompletely superimposed holograms are differentiated during reconstruction by Phase Correlation Multiplex Holography (PCMH).

19. Process of claim 12 including reconstruction of stored data to yield an output data stream, the process including decoding of detected data to accommodate encoding.

20. Process of claim 12 in which the array is constituted of pixel rows and columns, pixels comprising codewords constituted of codeword-common symbols and in that encoding includes 2-dimensionally dispersing codewords so that at least some of the codeword-common symbols of a particular codeword occupy different rows or columns.

21. Process comprising reconstruction of stored data constituted of symbols, the process including detection of the data in the form of a 2-dimensional pixel array, and decoding the pixel array, the pixel array containing contiguous same-state pixels constituting "same-state pixel runs" of an average value of run-length, CHARACTERIZED IN THAT
decoding comprises a decoding procedure increasing average same-state pixel run-length by at least 10%, the decoding procedure consisting of combining with a reference random bit stream.

22. Process comprising reconstruction of stored data constituted of symbols, the process including detection of the data in the form of a 2-dimensional pixel array, and decoding the pixel array the pixel array, containing contiguous same-state pixels constituting "same-state pixel runs" of an average value of run-length, CHARACTERIZED IN THAT
decoding comprises a decoding procedure increasing average same-state pixel run-length by at least 10%, the decoding procedure accommodating an encoding procedure whereby run-length of same-state pixels was deterministically limited.

* * * * *